3,712,886
METHOD FOR PREPARING CELLULOSE ETHER DERIVATIVES

Shunichi Koyanagi, Kinya Ogawa, Yoshiro Onda, and Akira Yamamoto, Naoetsu, Japan, assignors to Shinetsu Chemical Company, Chicago, Ill.
No Drawing. Filed Feb. 24, 1971, Ser. No. 118,555
Claims priority, application Japan, Mar. 6, 1970, 45/19,553
Int. Cl. C08b 11/00
U.S. Cl. 260—226      11 Claims

ABSTRACT OF THE DISCLOSURE

Cellulose ether represented by the general formula:

$$R_m^1 R_n^2 A$$

(where $R^1$ is a hydroxyalkyl radical having 3 or 4 carbon atoms, $R^2$ is a hydrogen atom or an alkyl radical of 1 or 2 carbon atoms, $m$ and $n$ are positive integers and A a cellulose residue) is reacted, in an organic acid medium, with tetrahydrophthalic anhydride, hexahydrophthalic anhydride or their mixture or a mixture of one of these three and other dibasic and/or tribasic anhydrides, in the presence of an anhydrous alkali metallic salt of acetic acid acting as the catalyst. A cellulose ether derivative thus obtained is a novel substance characterized by high solubility both in organic solvents and alkalis, as well as superior moisture permeability resistance and stability, so that it is useful as a tablet-coating material and a base for paints.

SUMMARY OF THE INVENTION

This invention relates to a method for preparing novel cellulose ether derivatives. There are many kinds of cellulose ethers and ether derivatives which are well known, such as cellulose acetate phthalic acid ester (hereinafter abbreviated as CAP), cellulose acetate hexahydrophthalic acid ester (CAHHP), cellulose acetate tetrahydrophthalic acid ester (CATHP) and methylcellulose phthalate (MCP). But CAP does not possess moisture permeability resistance and stability, so that during storage, it is liable to be hydrolyzed by the moisture contained in the air, thereby isolating acetic acid; as to CAHHP and CATHP, they have a little higher moisture permeability resistance than CAP but as poor a stability as CAP does, so that there is a fear of their generating acetic acid while they are stored; MCP does not have sufficient solubility in organic solvents, nor does it possess with moisture permeability resistance. Thus, the uses of these are limited.

An object of the invention is to provide novel and useful cellulose ether derivatives, free from such disadvantages as given above, and another object of the invention is to provide cellulose ether derivatives, which are soluble in organic solvents and alkali solutions, and possess excellent moisture permeability resistance and superior stability.

This invention is characterized by reacting a cellulose ether represented by the general formula:

$$R_m^1 R_n^2 A$$

(where $R^1$ is a hydroxyalkyl radical having 3 or 4 carbon atoms, $R^2$ is a hydrogen atom or an alkyl radical of 1 or 2 carbon atoms, $m$ and $n$ are integers, and A a cellulose residue) in an organic acid medium, with tetrahydrophthalic anhydride or hexahydrophthalic anhydride, or their mixture or a mixture of one of these three and other dibasic and/or tribasic anhydrides, in the presence of an anhydrous alkali metallic salt of acetic acid acting as the catalyst, and it is based on our observations that by such a method the desired cellulose ether is prepared quite easily and in good yield, and that the product obtained is provided with various excellent properties.

The raw materials employed in carrying out the method of the invention are as follows: a cellulose ether represented by the above-given general formula:

$$R_m^1 R_n^2 A$$

and tetrahydrophthalic anhydride, hexahydrophthalic anhydride, and a mixture of either of them and other dibasic or tribasic anhydrides. Said cellulose ether is exemplified by hydroxypropyl cellulose (HPC), hydroxybutyl methylcellulose (HBMC), hydroxypropyl methylcellulose (HPMC), hydroxybutyl cellulose (HBC), and hydroxypropyl ethylcellulose (HPEC).

Such properties of the cellulose ether derivatives as solubility in organic solvents and alkalis, moisture permeability resistance, and stability are substantially affected by the amounts of the substitution radicals contained in the cellulose ether from which they are prepared, so that the (molecular) number of the substitution moles per anhydrous glucose unit (abbreviated as M.S.) of hydroxyalkyl radicals contained in hydroxyalkyl cellulose should advantageously be from 0.2 to 5.0, or more preferably from 1.0 to 4.0. In the case of hydroxyalkyl alkyl cellulose, the M.S. of hydroxyalkyl radicals should advantageously be at least 0.02, or more preferably at least 0.05. Furthermore, it is desirable in this case that the total of M.S. of hydroxyalkyl radicals and that of alkyl radicals is from 0.5 to 5.0 or more preferably from 1.0 to 4.0.

Other dibasic or tribasic anhydrides which can be mixed with tetrahydrophthalic anhydride or hexahydrophthalic anhydride are exemplified by phthalic anhydride and trimellitic anhydride.

In practicing the method of the invention, the prescribed amounts of the reaction materials are put in an organic acid medium and reacted in the presence of an anhydrous alkali metallic salt of acetic acid, acting as the catalyst. The ratio in quantity of these raws materials vary in accordance with the kinds of the raw materials employed as well as with the properties desired of the product, but usually 100 parts by weight of said cellulose ether are mixed with from 30 to 200 parts by weight of tetrahydrophthalic anhydride, hexahydrophthalic anhydride or a mixture therefor or a mixture of one of these three and other dibasic and/or tribasic anhydrides. As the organic acid medium, acetic acid, propionic acid or butyric acid, may be employed in amounts from 50 to 1000 parts by weight, or more preferably from 200 to 600 parts by weight are used per 100 parts by weight of cellulose ether charged.

As to the anhydrous alkali metallic salt of acetic acid employed as the catalyst, from 5 to 40 parts by weight of it should advantageously be added to 100 parts by weight of said organic acid medium. The reaction temperature is usually kept between 40 and 100° C., but it is more preferable to make it between 60 and 100° C. in the early period of the reaction and between 40 and 80° C. in the late period of the reaction. Such a temperature arrangement will make it possible for the reaction to proceed remarkably well in the early stage and for the esterification of the reactants to be highly promoted in the late stage. The reaction time is usually between 2 and 20 hours, although it depends upon the reaction conditions.

As both the starting materials and the reaction product are soluble in the organic acid medium, the reaction proceeds always in a uniform system, and when the reaction is over, the whole system will be a transparent viscous liquid. If this liquid is poured into a large amount of water, or a large amount of water is poured into it, the reaction product precipitates, which is filtered off, washed with water, dried and recovered as a white powder.

The reaction product prepared by the method of the invention is a monoester compound in which one of the acid radicals contained in the acid anhydride, which was employed as the starting material, is combined with a hydroxyl radical, of the cellulose or of the hydroxyalkyl radicals in said cellulose ether to form an ester, with the remaining acid radicals turned into free carboxyl radicals. It is exemplified by tetrahydrophthalic monoester and hexahydrophthalic monoester, both being of said cellulose ether, and a mixed monoester prepared by partial reaction of phthalic anhydride and trimellitic anhydride. The M.S. of acyl radicals contained in hexahydrophthalate and/or tetrahydrophthalate of said cellulose ether should advantageously be at least 0.2, or more preferably at least 0.3, and in the case of the above-given mixed esters, the M.S. should advantageously be at least 0.3. When hydroxypropyl cellulose, the M.S. of whose hydroxypropyl radicals is 3.0, is esterified under the reaction conditions described above, then depending upon the condition, a monoester having acyl radicals, whose M.S. is approximately between 0.6 and 2.0 is obtained, and when hydroxypropyl methylcellulose, the M.S. of whose hydroxypropyl radicals is 0.27 and that of whose methyl radicals is 1.87, is esterified, a monoester, the M.S. of whose acyl radicals is approximately between 0.2 and 1.0, is obtained, both depending upon the reaction conditions. The esters thus prepared are each easily soluble in a single or mixed solvents such as acetone, methyl alcohol, ethyl alcohol, isopropyl alcohol, methyl Cellosolve, ethyl Cellosolve, dioxane ether, methylethyl ketone, diacetylene alcohol, benzene, toluene, methyl lactate, methyl acetate, ethyl acetate, methylene chloride, trichloroethylene, methyl chloroform, chloroform and ethylene chloride, and especially in an aqueous solution of an alkali and they show moisture permeability resistance and stability, much superior to those of known cellulose ethers.

Of these products, those which contain tetrahydrophthalyl radicals and/or hexahydrophthalyl radicals whose M.S. is at least 0.8 are soluble in the McIlvaine's buffer solution having a pH of at least 7.0, but when their M.S. is below 0.8, such products will be soluble in the McIlvaine's buffer solution having a pH at least of any desired value between 4.5 and 7.0. This is also the case with mixed esters containing phthalyl radicals and/or trimellitic radicals besides tetrahydrophthalyl radicals and/or hexahydrophthalyl radicals, e.g., mixed monoesters containing tetrahydrophthalyl radicals whose M.S. is 0.41 and phthalyl radicals whose M.S. is 0.40 which are soluble in the McIlvaine's buffer solution whose lowest limit of pH value is 6.0. But in the case of the mixed ester, if the hexahydrophthalic acid ester and/or tetrahydrophthalic acid ester is present in a molar ratio less than phthalic acid ester or trimellitic acid ester, its high solubility in an organic solvent and superior moisture permeability resistance will be decreased, so that it is desirable that the quantity of the hexahydrophthalic acid ester and/or of tetrahydrophthalic acid ester is always the same or larger than that of the phthalic acid ester and/or trimellitic acid ester.

As described above, the novel cellulose ether derivatives prepared by the method of the invention possess excellent properties, so that they are advantageously employed generally as tablet coating materials and as bases of special painting materials.

In the following examples, parts and percent are parts and percent by weight, M.S. stands for the molecular number of substitution radicals per anhydrous glucose unit and R.H. stands for relative humidity.

EXAMPLE 1

In a reactor equipped with a stirrer were put 50 parts of hydroxypropyl cellulose (M.S. of hydroxypropyl radicals: 3.0, and the viscosity of a 2% aqueous solution at 25° C.: 5 cps.), 100 parts of glacial acetic acid, 25 parts of anhydrous sodium acetate, and 70 parts of tetrahydrophthalic anhydride, and while being stirred, the mixture reacted at first at 85° C. for 2 hours, and then at 65° C. for 3 hours. To the transparent viscous liquid prepared by the reaction were added under agitation 800 parts of water, obtaining a precipitate, which was filtered off, washed with water and dried at 60° C. for 5 hours. The product thus obtained proved to be 81 parts of the tetrahydrophthalic acid monoester of hydroxypropylcellulose and the M.S. of the hexahydrophthalyl radicals was 1.65.

EXAMPLE 2

An experiment similar to the one described in Example 1 was conducted in which the difference was the use of hexahydrophthalic anhydride instead of tetrahydrophthalic anhydride, obtaining about 80 parts of the hexahydrophthalic acid monoester of hydroxypropylcellulose (M.S. of hexahydrophthalyl radicals: 1.63).

EXAMPLE 3

An experiment similar to the one described in Example 1 was conducted in which the differences were the use of hydroxypropyl methylcellulose (M.S. of hydroxypropyl radicals: 0.27, M.S. of methyl radicals: 1.87, and the viscosity of a 2% aqueous solution at 25° C.: 5 cps.) instead of hydroxypropyl cellulose, and the use of anhydrous potassium acetate instead of anhydrous sodium acetate. About 75 parts of the tetrahydrophthalic acid monoester of hydroxypropyl methylcellulose (M.S. of tetrahydrophthalyl radicals: 0.85) were obtained.

EXAMPLE 4

An experiment similar to the one described in Example 1 was conducted in which the differences were the use of hydroxypropyl methylcellulose (like the one employed in Example 3) instead of hydroxypropyl cellulose, and that of hexahydrophthalic anhydride instead of tetrahydrophthalic anhydride. About 76 parts of hexahydrophthalic acid monoester of hydroxypropyl methylcellulose (M.S. of hexahydrophthalyl radicals: 0.85) were obtained.

EXAMPLE 5

An experiment similar to the one described in Example 1 was conducted in which the differences were the use of hydroxybutyl methylcellulose (M.S. of hydroxybutyl radicals: 0.21, M.S. of methyl radicals: 1.85) instead of hydroxypropyl cellulose and that of hexahydrophthalic anhydride instead of tetrahydrophthalic anhydride. About 73 parts of hexahydrophthalic acid ester of hydroxybutyl methylcellulose (M.S. of hexahydrophthalyl radicals: 0.81) were obtained.

EXAMPLE 6

In a reactor equipped with a stirrer were put 50 parts of hydroxypropyl methylcellulose (like the one employed in Example 3), 200 parts of glacial acetic acid, 50 parts of anhydrous sodium acetate, 30 parts of tetrahydrophthalic anhydride, and 30 parts of phthalic anhydride, and while being stirred, they were reacted first at 85° C. for 2 hours, and then at 60° C. for 3 hours. To the transparent viscous liquid prepared by the reaction were added under agitation 1,600 parts of water, and the precipitate obtained was filtered off, washed with water and dried at 60° C. for 5 hours. The product thus obtained proved to be about 73 parts of mixed monoesters with the M.S. of the tetrahydrophthalyl radicals being 0.41 and that of the phthalyl radicals being 0.40.

EXAMPLE 7

An experiment similar to the one described in Example 6 was conducted in which the only difference was the use of 47 parts of hexahydrophthalic anhydride and 23 parts of phthalic anhydride, both as the acid anhydride. About 73 parts of mixed monoesters with the M.S. of the hexahydrophthalyl radicals being 0.57 and that of the phthalyl radicals being 0.23 were obtained.

EXAMPLE 8

An experiment similar to the one described in Example 6 was conducted in which the differences were the use of 30 parts of hexahydrophthalic anhydride and 35 parts of trimellitic anhydride, both as the acid anhydride, and that of an anhydrous potassium acetate instead of an anhydrous sodium acetate. About 72 parts of mixed monoesters with the M.S. of the hexahydrophthalyl radicals being 0.41 and that of the trimellityl radicals being 0.35 were obtained.

EXAMPLE 9

The cellulose ether derivatives obtained in Examples 1, 2, 3, 4, 5, 6, 7 and 8 and well-known CAP (M.S. of acetyl radicals: 1.66, and M.S. of phthalyl radicals: 0.75), and MCP (M.S. of methyl radicals: 1.76 and M.S. of phthalyl radicals: 0.71) were tested to determine their solubility in organic solvents, in the McIlvaine's buffer solution, in aqueous solutions of alkalis, in aqueous solutions of acids, as well as the degree of their moisture permeability resistance. The results obtained are given in Tables 1 and 2, and demonstrate the superiority of the products prepared by the method of the invention to CAP or MCP, in solubility in organic solvents as well as in moisture permeability resistance.

EXAMPLE 10

Stability against hydrolysis was measured of the samples employed in Example 9 and CAHHP (M.S. of acetyl radicals: 1.48 and M.S. of hexahydrophthalyl radicals: 0.72), CATHP (M.S. of acetyl radicals: 1.50 and M.S. of tetrahydrophthalyl radicals: 0.73). The results are given in Table 3 and show that the products prepared by the method of the invention are superior to the controls in stability and that they do not contain any free acid.

The testing methods employed in the experiment were as follows.

(1) Measurement of the amount of free acetic acid: Each of the samples was pulverized and put in a tube kept at 55° C. and R.H. 100%. The tubes were sealed and were then allowed to stand under the same conditions for a prescribed number of days, and then cooled. A certain amount of the sample was taken out of the tube. By means of the Soxhlet's extractor, free acetic acid contained in the sample was extracted with ethyl ether, and the acetic acid in the ethyl ether was subjected to quantitative analysis by gas-chromatography, obtaining the amount of free acetic acid in the sample.

(2) Measurement of the amount of free acids except free acetic acid: Each of the pulverized samples was kept in a closed tube and let stand just as in (1). A certain amount of the sample was taken out of the tube, and was dissolved in a methylene chloride-ethanol mixture (2:3). After n-hexane was added to it, free acids were extracted with water, which then was titrated with 0.1 N sodium hydroxide, obtaining the total amount of free acids, from which was deducted the amount of free acetic acid obtained in (1) in order to determine the amount of free acids contained in the sample.

TABLE 1.—RESULTS OF THE TEST IN SOLUBILITY

| Sample solvent | Example number | | | | | | | | Controls | |
|---|---|---|---|---|---|---|---|---|---|---|
| | 1 | 2 | 3 | 4 | 5 | 6 | 7 | 8 | CAP | MCP |
| Organic solvents: | | | | | | | | | | |
| Acetone | S | S | S | S | S | S | S | S | S | SW |
| Methanol | S | S | S | S | S | SW | S | S | IS | IS |
| Methylene chloride | S | SW | S | SW | SW | SW | SW | SW | IS | IS |
| Ethyl acetate | S | SW | S | SW | SW | S | SW | SW | SW | IS |
| Acetone-methanol | S | S | S | S | S | S | S | S | S | S |
| Methyl chloride-methanol | S | S | S | S | S | S | S | S | S | S |
| Toluene-ethanol | S | S | S | S | S | S | S | S | S | S |
| McIlvaine's buffer solution (pH) | 7.0 | 7.0 | 7.0 | 7.0 | 7.0 | 6.0 | 6.4 | 5.6 | 6.0 | 6.0 |
| 1.5% aqueous solution of NaHCO$_3$ | S | S | S | S | S | S | S | S | S | S |
| Aqueous solution of HCl (pH: 2.0) | IS | IS | IS | IS | IS | IS | IS | IS | IS | IS |

NOTES: (1) Films (10 x 10 x 0.08 mm.) were prepared of each of the samples dissolved in a methanol-methylene chloride solution (1:1), and they were placed in the solvents given in the table to determine the solubility of the samples.
(2) In the table, mark S shows that the sample was soluble in the solvent or liquid, while mark SW shows that it got swollen in it, and mark IS shows that it was insoluble in it. The mixed solutions in the table were each prepared by mixing two solutions in the volumetric ratio of 1:1. The pH's of the McIlvaine's buffer solutions show the lowest values at which the samples began to dissolve.

TABLE 2.—RESULTS OF THE TEST IN MOISTURE PERMEABILITY RESISTANCE

| Samples | Moisture permeability (g./cm.$^2$ 24 hrs.) |
|---|---|
| Example number: | |
| 1 | 0.0020 |
| 2 | 0.0016 |
| 3 | 0.0130 |
| 4 | 0.0085 |
| 5 | 0.0075 |
| 6 | 0.0132 |
| 7 | 0.0098 |
| 8 | 0.0145 |
| Controls: | |
| CPA | 0.0222 |
| MCP | 0.0236 |

NOTE.—Films (0.1 mm. thick) were prepared of each of the samples and the moisture permeability was tested by measuring the weight increase of calcium chloride due to its moisture absorption through the films. The R.H. of on one side of the film was 100% and that on the other was 5%, at 40° C.

TABLE 3.—RESULTS OF THE TEST IN STABILITY

Amount of free acids generated (sample)

| | Example number | | | | | | | | Controls | | | |
|---|---|---|---|---|---|---|---|---|---|---|---|---|
| | 1 | 2 | 3 | 4 | 5 | 6 | 7 | 8 | CAP | MCP | CAHHP | CATHP |
| Passage of days: | | | | | | | | | | | | |
| 0 | 2.1 (0) | 1.6 (0) | 1.9 (0) | 1.5 (0) | 1.5 (0) | 1.0 (0) | 1.5 (0) | 1.2 (0) | 0.9 (0) | 0.2 (0) | 1.9 (0) | 1.5 (0) |
| 1 | 2.2 (0) | 1.8 (0) | 2.2 (0) | 2.0 (0) | 1.8 (0) | 1.6 (0) | 2.0 (0) | 2.0 (0) | 2.1 (1.2) | 1.0 (0) | 2.6 (0.3) | 2.3 (0.3) |
| 2 | 2.2 (0) | 2.0 (0) | 2.3 (0) | 2.5 (0) | 2.1 (0) | 2.1 (0) | 2.5 (0) | 2.6 (0) | 3.7 (2.8) | 1.8 (0) | 3.1 (0.8) | 2.9 (0.8) |
| 5 | 2.3 (0) | 2.4 (0) | 2.5 (0) | 3.4 (0) | 2.5 (0) | 2.6 (0) | 3.3 (0) | 3.5 (0) | 6.4 (5.2) | 2.5 (0) | 4.1 (1.0) | 4.0 (1.1) |
| 10 | 2.4 (0) | 2.6 (0) | 2.6 (0) | 3.8 (0) | 2.7 (0) | 3.4 (0) | 4.0 (0) | 4.0 (0) | 9.8 (7.0) | 3.6 (0) | 6.2 (2.1) | 5.7 (2.0) |
| 15 | 2.4 (0) | 2.6 (0) | 2.6 (0) | 3.8 (0) | 2.8 (0) | 3.5 (0) | 3.9 (0) | 4.3 (0) | 11.4 (10.8) | 3.9 (0) | 8.4 (4.5) | 7.9 (4.4) |

NOTE.—In the column where the passage of days is 0 are given the results of the blank test. The figures without parentheses show the amounts in percent of free acids and those in parentheses show the amounts in percent of acetic acid.

What is claimed is:

1. An ester selected from the group consisting of tetrahydrophthalic monoesters and hexahydrophthalic monoesters of a cellulose ether of the formula $$R_m^1 R_n^2 A$$

wherein $R^1$ is hydroxyalkyl containing 3 or 4 carbon atoms, $R^2$ is hydrogen, methyl or ethyl, $m$ and $n$ are positive integers, and A is a cellulose residue.

2. Hydroxypropylcellulose tetrahydrophthalate.
3. Hydroxypropylcellulose hexahydrophthalate.
4. Hydroxypropylmethyl cellulose tetrahydrophthalate.
5. Hydroxybutylmethyl cellulose hexahydrophthalate.
6. Hydroxypropylmethyl cellulose tetrahydrophthalate phthalate.
7. Hydroxypropylmethyl cellulose hexahydrophthalate phthalate.
8. A tetrahydrophthalic or hexahydrophthalic and trimellitic ester of cellulose ether of the formula $$R_m^1 R_n^2 A$$

wherein $R^1$ is hydroxyalkyl containing 3 or 4 carbon atoms, $R^2$ is hydrogen, methyl or ethyl, $m$ and $n$ are positive integers, and A is a cellulose residue.

9. Hydroxypropylmethyl cellulose hexahydrophthalate trimellitate.

10. Hydroxypropylmethyl cellulose hexahydrophthalate.

11. A tetrahydrophthalic or hexahydrophthalic and phthalic ester of a cellulose ether of the formula $$R_m^1 R_n^2 A$$

wherein $R^1$ is hydroxyalkyl containing 3 or 4 carbon atoms, $R^2$ is hydrogen, methyl or ethyl, $m$ and $n$ are positive integers, and A is a cellulose residue.

References Cited

UNITED STATES PATENTS

| 2,753,339 | 7/1956 | Malm et al. | 260—226 |
|---|---|---|---|
| 2,852,508 | 9/1958 | Hiatt et al. | 260—226 |
| 3,022,287 | 2/1962 | Mench et al. | 260—224 |
| 3,057,853 | 10/1962 | Crane | 260—226 |
| 1,994,038 | 3/1935 | Hagedorn et al. | 260—226 |

DONALD E. CZAJA, Primary Examiner

M. I. MARQUIS, Assistant Examiner

U.S. Cl. X.R.

106—187, 188, 189, 190, 191, 197 R; 260—225, 231 R; 424—362